2,867,127
Patented Jan. 6, 1959

2,867,127
CHANGE-SPEED DEVICE

Henri Fehr, Montmorency, France, assignor to Société Anonyme dite: Compagnie de Construction Mecanique, Procedes Sulzer, Paris, France Application March 22, 1956, Serial No. 573,214

Claims priority, application France March 22, 1955

1 Claim. (Cl. 74—378)

This invention relates to a change-speed device comprising magnetically-operated clutches, each of which consists of a stationary field magnet and two coaxial rotors, one of which serves as a rotary field magnet and the other as an armature.

Magnetic clutches of this character cannot operate satisfactorily unless their magnetic gaps are perfectly regular and uniform; this requires an accurate centering and alignment of their various component elements (fixed field coils, primary and secondary rotors). Now in the specific case of a unit comprising the engine, clutch and transmission of an automotive vehicle the tolerances permitted in the size of machined parts, on the one hand, and the wear of bearings, on the other hand, are such that these ideal requirements cannot be met and maintained indefinitely with all the desired certainty.

Now it is the object of this invention to free magnetic clutches of this character from the inconveniences arising from such misalignments and off-centerings between the primary and secondary shafts, on the one hand, and the cases containing the mechanisms on the other hand, this invention permitting, through the combination of a pair of magnetic clutches of this character with a constant-mesh gear train, to provide a transmission or a reversing gear adapted to be mounted at any desired location along the kinematic transmission line of a vehicle, without any exaggerated requirements regarding the centering and alignment of the driving and driven shafts with respect to each other or to the cases in which these mechanisms are mounted.

Thus, with this arrangement it is possible to mount a reversing gear of this general type between the power unit and the transmission of a lift truck or like vehicle, thereby increasing the ease of operation to a substantial degree since the direction of motion can be reversed by simply operating a two-way switch and without using the brakes, bringing the vehicle to a standstill or causing the movement of pinions or direct-drive dog-clutches.

In order to afford a clearer understanding of the invention and of the manner in which the same may be carried out in the practice, a typical embodiment thereof will be described hereafter by way of example with reference to the attached drawings forming part of this specification. In the drawings.

Figure 1:
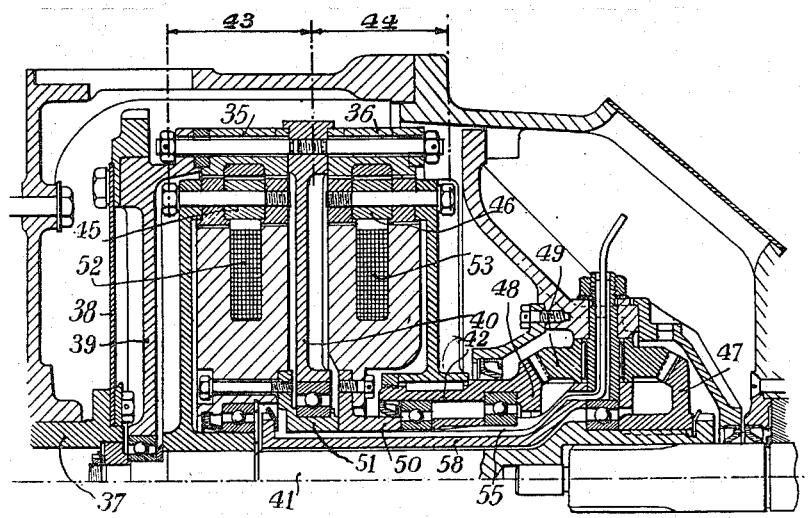
Figure 1 is a longitudinal half-sectional view of a reversing gear according to the invention.

The reversing gear is of the self-centering type so as to compensate any possible misalignments between the engine and the transmission; it consists of:

(1) A pair of rotary field magnets 35, 36 rotatably driven from the engine shaft 37 through a flexible diaphragm 38 supported by the pair of non-magnetic centering plates 39, 40;

(2) A solid shaft 41 and a hollow shaft 42 mounted coaxially to each other, the former internally and the latter externally (in order to reduce the relative speeds of the centering bearings) of a tubular member 58 acting as a support of the reversing gear unit and also as a supporting and centering means to the coupling assembly 43 and 44;

(3) The armatures 45, 46 are keyed on these shafts 41, 42 together with the bevel pinions 47, 48 meshing with idler wheels 49 mounted at spaced angular intervals around their peripheries.

The tubular member 58 is adapted to carry and centre through the medium of a pair of spacers 50, 51 of non-magnetic material the pair of fixed field magnets 52, 53 of which the lead-in wires pass through the passage 55 milled in the supporting tube and the hollow shafts of the planet wheels.

Operation

Figure 2:
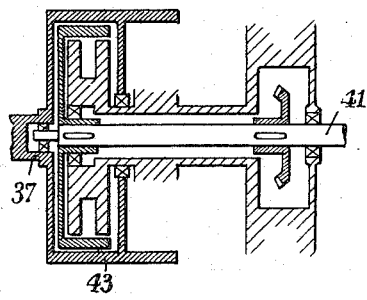
Figures 2 and 3 are illustrative diagrams.

When the thermal engine is in motion the coupling 43 is energized so as to progressively drive and set in step the rotor 45, and the motion is transmitted directly to the transmission and to the wheels through the shaft 41 (Fig. 2).

As the vehicle is moving forwards, if the driver energizes the coupling 44, the rotor 46 rotating in a direction opposite to that of the rotors 45 and 35—36 due to the action of the reversing gear is retarded and then progressively driven and set in step in the direction of rotation of 36.

Figure 3:
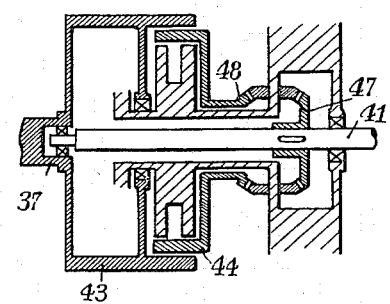

The motion which is then transmitted through the pinion 48, planet wheels 49 and pinion 47 to the shaft 41 is reversed due to the action of these meshing gears and the vehicle will be driven in reverse (Fig. 3).

What I claim is:

A change-speed device comprising an engine shaft, a first and a second adjacent coaxial rotary field magnet driven from said engine shaft, non-magnetic centering plates carrying said two rotary field magnets, a fixed tubular member, coaxial with said engine shaft, a first shaft disposed internally of said tubular member, a first armature solid with said first shaft, another, hollow shaft coaxial to and mounted externally of said tubular member, another armature solid with said other hollow shaft, a first and a second stationary field member, said first and second rotary field magnets, armatures and stationary field members being coaxial respectively and constituting a pair of synchronous homopolar clutches, and a train of gears constituting a mechanical connection between said other hollow shaft and said first shaft, whereby, when said first stationary field member is energized, said first armature is rotatably driven from said first rotary field magnet and the motion of said engine shaft transmitted directly to said first shaft, and, when said other stationary field member is energized, said other armature is driven and the motion of said engine shaft transmitted through said other rotary field magnet to said other shaft and then through said train of gears to said first shaft.

References Cited in the file of this patent

UNITED STATES PATENTS

| | | |
|---|---|---|
| 1,461,542 | Neuland | July 10, 1923 |
| 2,042,189 | Rabe | May 26, 1936 |
| 2,224,254 | Cotal | Dec. 10, 1940 |
| 2,304,030 | Schmitter | Dec. 1, 1942 |
| 2,749,766 | Blair | June 12, 1956 |